United States Patent [19]

Hager

[11] 4,254,532

[45] Mar. 10, 1981

[54] CASTER APPARATUS

[75] Inventor: Clarence H. Hager, Rockford, Ill.

[73] Assignee: Modern Suspension Systems, Inc., Rockford, Ill.

[21] Appl. No.: 957,481

[22] Filed: Nov. 3, 1978

[51] Int. Cl.³ .............................................. B60B 33/00
[52] U.S. Cl. ........................................................ 16/20
[58] Field of Search .................. 16/18 B, 47, 48, 20, 16/35, 35 D, 41, 44, 23; 105/170

[56] References Cited

U.S. PATENT DOCUMENTS

| | | | |
|---|---|---|---|
| 273,298 | 3/1883 | Ogborn | 16/48 |
| 503,483 | 8/1893 | Polster | 16/44 |
| 1,739,716 | 12/1929 | Fisher | 16/35 D |
| 2,306,179 | 12/1942 | Mulholland | 16/35 D |
| 2,410,047 | 4/1948 | Heller | 16/23 |
| 2,688,149 | 9/1954 | Popp | 16/35 D |
| 2,738,542 | 3/1956 | Clark, Jr. | 16/44 |
| 2,830,345 | 4/1958 | Robinson et al. | 105/170 |
| 3,518,714 | 7/1970 | Hager | 16/35 D |
| 3,518,714 | 7/1970 | Hager | 16/35 |

*Primary Examiner*—Doris L. Troutman
*Attorney, Agent, or Firm*—Morsbach & Pillote

[57] ABSTRACT

A caster apparatus of the type having a caster bracket mounted on a mounting base for swivel motion about an upright swivel axis and a caster wheel mounted on the caster bracket, in which the mounting base has a downwardly facing annular trackway spaced outwardly from the swivel axis, a roller is mounted on the caster bracket for rotation about an axis extending generally radially of the caster axis and in rolling engagement with the annular trackway, and pads are mounted on the caster bracket at a location to engage the annular trackway adjacent the roller to wipe the trackway in advance of the roller when the caster bracket swivels and to also dampen swivelling of the caster bracket about the caster axis.

10 Claims, 4 Drawing Figures

CASTER APPARATUS

BACKGROUND OF THE INVENTION

Caster wheels such as are used on factory trucks, baggage trucks and the like are sometimes subjected to very high shock loads during use, particularly when the vehicle is traveling at a high speed. The caster wheel axis is horizontally offset a substantial distance from its swivel axis in order to cause the caster to trail properly and, even when the caster wheel is operating under its rated load and is in proper trailing position on the ground, the caster bracket that swivelly supports the ground engaging wheel will be subjected to very high impact forces if the ground engaging wheel strikes a substantial obstruction or other irregularity in the ground while the vehicle is traveling at relatively high speed. Further, when the vehicle is drawn over an irregular surface, the caster wheel will sometimes move out of engagement with the ground. If the caster turns or swivels about its swivel axis while out of engagement with the ground, the ground engaging wheel will not be in a position to roll properly when it thereafter contacts the ground and the caster will be subjected to high lateral forces until the wheel again swings into proper trailing position. If the vehicle is traveling at a relatively high speed, these forces have sometimes been sufficient to break or otherwise damage the caster wheel.

Shock absorbing type caster apparatus such as shown in the applicant's prior U.S. Pat. No. 3,518,714 are adapted to yield upwardly when the wheel engages an obstruction to allow the wheel to pass over the obstruction. It has also been proposed, as shown in the aforementioned U.S. Pat. No. 3,518,714 to provide a swivel dampening brake to inhibit swivelling of the caster when the ground engaging wheel moves out of engagement with the ground. However, the impact forces exerted on the swivel bracket of the caster when the wheel strikes an obstruction while the vehicle is traveling at a high speed have still been sufficiently high to break or damage such caster.

In order to reduce the stresses opposed on the caster bracket when it strikes an obstruction, it has heretofore been proposed for example as shown in U.S. Pat. No. 2,803,545 to provide an anti-friction bearing assembly between the caster bracket and the mounting base and spaced radially outwardly of the swivel axis a distance approximating the amount of horizontal offset of the ground engaging wheel from the swivel axis. However, such a large diameter anti-friction bearing assemblies are very expensive and, moreover, would require expensive large diameter annular seals to prevent damage due to the entrance of foreign material. It has also been proposed as is shown in U.S. Pat. No. 2,440,047 to use a plurality of rollers mounted on the caster bracket for rotation about axes extending generally radially of the swivel axis at uniform spaced locations therearound to engage the caster mounting base and aid in swivelly supporting the caster. However, trucks using casters are frequently used in areas where they are exposed to dust, dirt and other foreign matter and the operation of the caster disclosed in that patent would be impaired if foreign matter accumulated in an area where the rollers operate.

SUMMARY OF THE INVENTION

An important object of this invention is to overcome the disadvantages of the prior art by providing a caster apparatus having an improved arrangement for swivelly mounting the caster bracket on the mounting base and which provides a roller support between the swivel bracket and the mounting base at a point spaced radially outwardly of the swivel axis and which effectively overcomes the problems encountered due to dirt or other foreign material.

Another object of this invention is to provide caster apparatus having swivel dampening means to inhibit swivelling of the caster when it is out of engagement with the ground.

Accordingly, the present invention provides a caster apparatus including a mounting base, a caster bracket means mounted for swivel motion relative to the base about an upright swivel axis, and a ground engaging wheel rotatably mounted on the caster bracket means for rotation about a generally horizontal wheel axis offset in one direction from the swivel axis, the mounting base having an annular downwardly facing trackway spaced radially outwardly from the swivel axis, roller means mounted on the caster bracket means for rotation about a roller axis extending generally radially of the swivel axis at a location above the wheel axis and in rolling engagement with the trackway, and pad means mounted on the caster bracket means at a location to engage the trackway adjacent the roller means and movable with the caster bracket means to wipe the trackway in advance of the roller means when the caster bracket means swivels in either direction and to also dampen swivelling of the caster bracket means about the swivel axis.

The caster apparatus is preferably of the shock absorbing type in which the caster bracket also includes a wheel support bracket pivotally mounted on the caster bracket for vertical swinging movement relative thereto about a horizontal axis, and a yieldable means engaging the caster bracket and the wheel support bracket to yieldably urge the wheel support bracket in a direction to press the wheel downwardly relative to the caster bracket.

These, together with other objects, features and advantages of this invention will become more readily understood by reference to the following detailed description, when taken in connection with the accompanying drawings wherein.

The caster unit of the present invention is adapted for attachment to a vehicle such as a factory truck, baggage truck or the like, for example as shown in U.S. Pat. No. 3,518,714. The number of caster units used for each vehicle will vary in different installations and may comprise one or more caster units used with one or more fixed wheel units in different wheel configurations. The caster apparatus in general comprises a mounting base 10 which is adapted for attachment to the vehicle, a caster bracket means mounted for swivel motion relative to the mounting base about an upright swivel axis Sa and wheel means 13 mounted for rotation about a wheel axis Wa horizontally offset from the swivel axis Sa. In the preferred embodiment illustrated, the caster apparatus is of the shock absorbing type.

Figure 2:
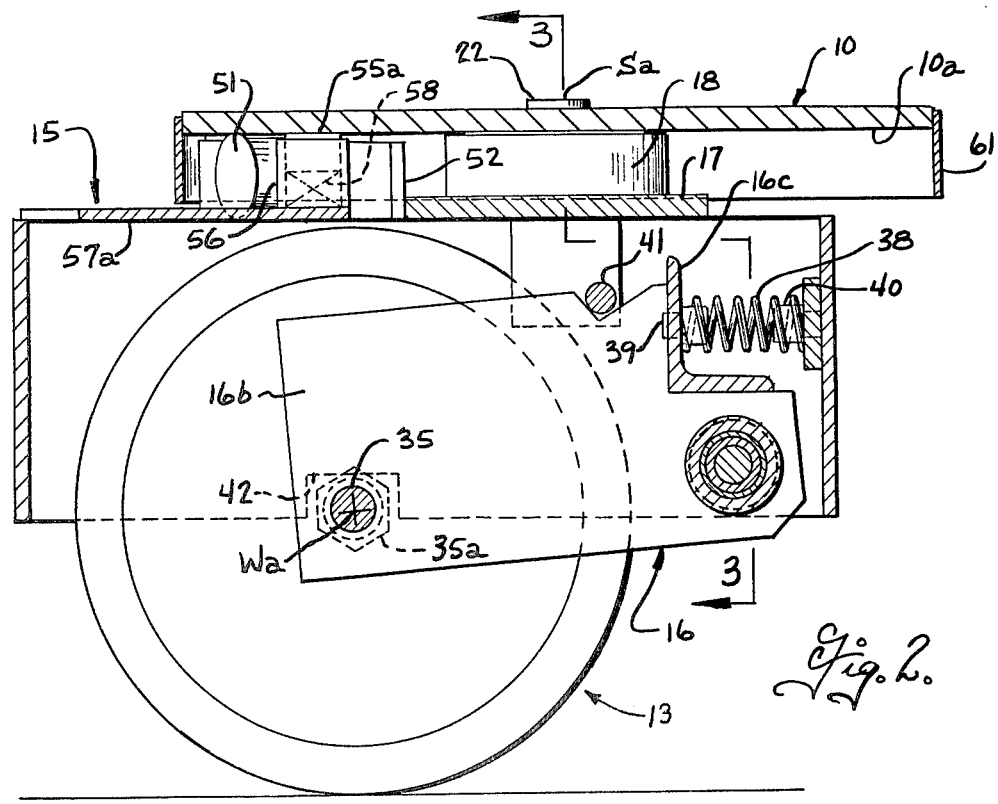
FIG. 2 is a vertical sectional view taken on the plane 2—2 of FIG. 1.

The caster mounting base 10 is constructed and arranged to provide an annular downwardly facing trackway 10a that is spaced outwardly from the swivel axis Sa a distance at least as great as the horizontal offset of the wheel axis from the swivel axis, and preferably somewhat greater as best shown in FIG. 2. In the shock absorbing type caster apparatus shown, the caster bracket means comprises a rigid caster bracket 15 and a wheel support bracket 16 that is mounted on the caster bracket for vertical swinging movement relative thereto. In the embodiment shown, the caster is conveniently fabricated from flat metal stock and the caster bracket 15 includes a top plate 17 having an annular bearing retainer 18 secured thereto as by fasteners 19, and the caster bracket is swivelly mounted on the mounting base 10 by an anti-friction bearing assembly 21 and a king pin 22. The anti-friction bearing assembly is preferably of the tapered roller bearing type and has its outer race disposed in a recess in the bearing retainer 18 and its inner race disposed on the king pin 22 with a nut 22a threaded on the king pin and engagable through a washer 22b with the inner bearing race to enable tightening of bearing assembly. The anti-friction bearing 21 has a diameter that is small compared to the radial offset of the wheel axis from the swivel axis and inexpensive small diameter face seals such as annular wiper rings 23a and 23b are conveniently provided between the bearing retainer 18 and the mounting base to inhibit entrance of foreign material to the bearing 21. The downwardly facing annular trackway 10a is spaced radially outwardly from the swivel bearing 21.

Figure 1:
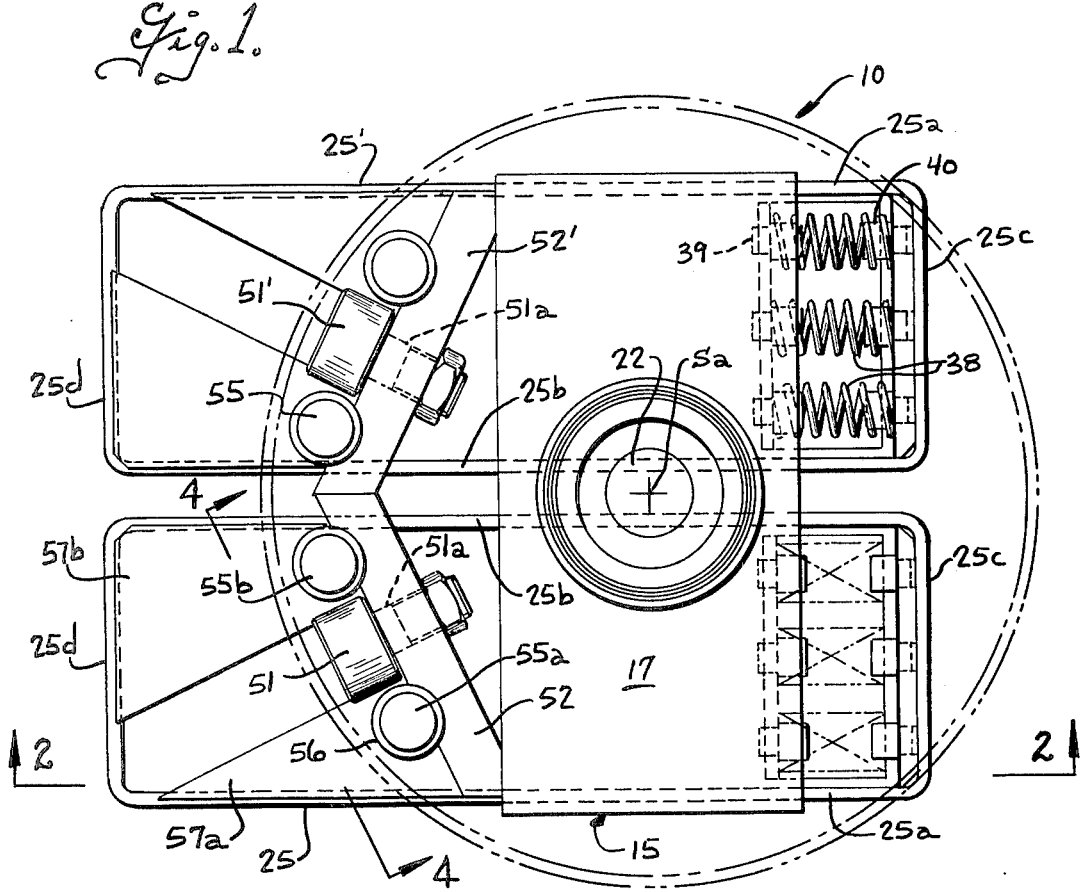
FIG. 1 is a plan view of the caster apparatus with the caster mounting base shown in phantom.
Figure 3:
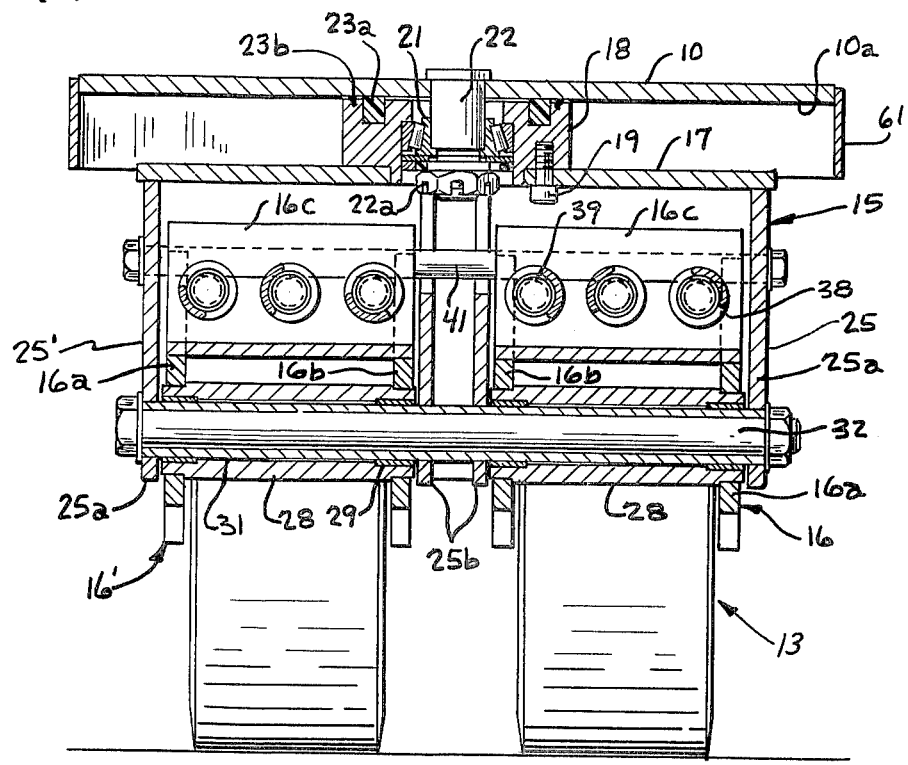
FIG. 3 is a vertical transverse sectional view taken on the plane 3—3 of FIG. 2.

The caster apparatus illustrated in the drawings is of the dual wheel type and the caster bracket 15 includes a pair of generally rectangular frames 25 and 25', each of which includes spaced side members 25a and 25b, and end members 25c and 25d. The side members 25a and 25b of each frame are secured as by welding to the underside of the top plate 17 and the pair of frames 25, 25' are disposed in spaced side-by-side relation as best shown in FIGS. 1 and 3. A pair of wheel support brackets 16, 16' are provided, one for each frame 25, and each wheel support bracket includes a pair of spaced side members 16a and 16b and a generally L-shaped crosspiece 16c secured as by welding to the spaced side members adjacent one end thereof. A tubular hub 28 is secured to the spaced side members 16a and 16b of each wheel support bracket and bearing 29 are disposed within the hub 28 to rotatably support the wheel support brackets on a tubular shaft 31 that extends through the side plates 25a, 25b on the frames 25, 25' of the caster bracket 15. A bolt 32 extends through the tubular shaft 31 and engages the side members 25a on the frames 25, 25'. In this manner, the wheel support brackets are supported for limited vertical swinging movement on the caster bracket 15. The ground engaging wheels 13 are mounted on an axle 35 that extends through the wheel mounting brackets 16, 16' at a location horizontally offset from the caster swivel axis Sa and also from the axis of the shaft 31. A plurality of springs 38 are interposed between the cross piece 16c on the wheel support bracket 16, 16' and the cross pieces 25c on the caster brackets 25, 25' and arranged to yieldably urge the wheel support brackets in a direction to press the wheels downwardly from the position shown in FIG. 2. Coil spring locators 39 and 40 are provided on the cross pieces 16c and 25c respectively to engage and locate the coil springs. A stop pin 41 is mounted on the side members 25a, 25b of the frames 25, 25' and extends crosswise of the path of movement of the wheel support brackets 16, 16' to engage the cross piece 16c on the wheel support brackets and limit downward swinging movement of the wheel support brackets. As best shown in FIG. 2, the side members 25a and 25b of the frames 25, 25' are constructed and arranged to provide stops 42 which engage nuts 35a on the ends of the axle 35 and limit upward movement of the wheels, when they reach an upper position as shown in FIG. 2, as may occur when the caster is overloaded or the wheel engages an obstruction.

Figure 4:
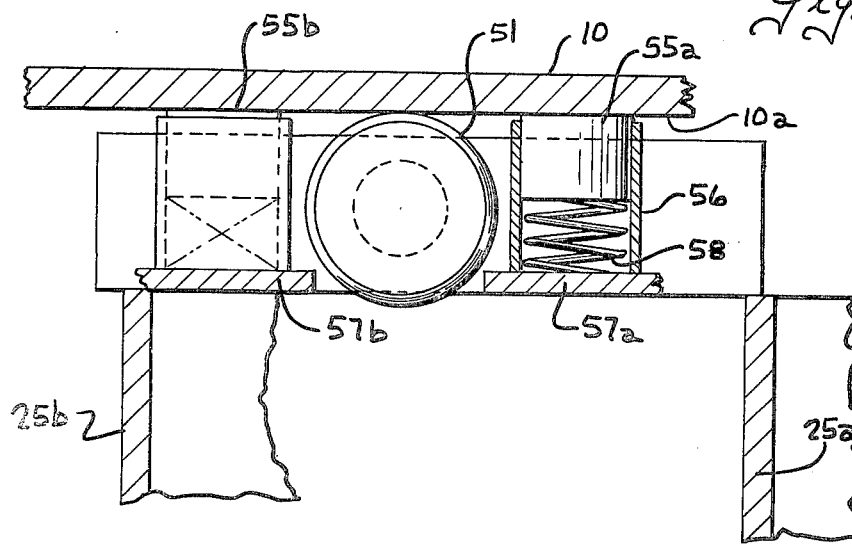
FIG. 4 is a fragmentary vertical sectional view taken on the plane 4—4 of FIG. 1 and illustrating the parts on a larger scale.

The shock absorbing type caster is adapted to yield any pass over obstructions and consequently absorb some of the impact on the caster that occurs when the wheel engages an obstruction. However, at high vehicle speeds or when the wheel of the shock absorbing caster reaches the upper limit of its travel with the wheel shaft 31 engaging the stop 42, substantial impact forces are transmitted to the swivel mounting of the caster brackets on the mounting base. The swivel bearing 21 has a relatively small diameter as compared to the horizontal offset of the wheel axis from the swivel axis and, in order to prevent over stressing of the caster bracket and the swivel support therefor, auxiliary bearing means are provided between the caster bracket and the wheel base. While it is advantageous to provide rollers spaced radially outwardly of the swivel axis to support the caster bracket on the base, it has been found that it is not necessary to provide a multiplicity of rollers spaced uniformly around the swivel axis and that it is only necessary to provide rollers at the side of the swivel axis from which the ground engaging wheel is offset. In the preferred embodiment shown, a pair of rollers 51, 51' are mounted on the swivel bracket 15 for rotation about axes extending generally radially of the swivel axis Sa and spaced radially outwardly of the swivel axis a distance at least as great as the horizontal offset of the ground engaging wheels from the swivel axis. The rollers 51 are arranged to engage the downwardly facing trackway 10a of the underside of the mounting base and to aid in supporting the swivel bracket on the mounting base. Rollers 51 are coveniently of the anti-friction type that are rotatably supported on a mounting stud 51a with self-contained bearing seals (not shown). The studs 51a extend through openings in members 52, 52' secured to the frames 25, 25' of the caster bracket 15. Pads are mounted on the caster brackets for movement therewith and at a location to engage the annular trackway 10a adjacent the rollers 51. As best shown in FIG. 4, a pair of pads 55a, 55b are provided for each roller and the pads are conveniently in the form of generally cylindrical blocks that are guidably received in sleeves 56 secured as by gusset plates 57a, 57b on the frames 25, 25' and the pads are yieldably biased upwardly as by compression springs 58 to engage the trackway 10a at the underside of the mounting base. The pads are formed of a relatively hard wear resistant material, preferably a non-metallic material such as plastic, and the pads are dimensioned and arranged adjacent opposite circumferential sides of the respective roller 51 so as to wipe the trackway 10a in advance of the roller when the caster bracket swivels in either direction about the swivel axis, to thereby provide a clean surface for engagement by the roller. In addition, the pads 25 provide a swivel dampening function to inhibit the free swivelling of the caster bracket relative to the mounting bracket. The amount of swivel dampening can be controlled by suitable selection of the type and hardness of the pad material and stiffness of springs 58 and is preferably arranged so as to supply a light swivel dampening action which does not materially impede swivelling of the caster when the wheels are in engagement with the ground, but which is yet sufficient to inhibit free swivelling of the caster in the event the wheels move out of engagement with the ground. For example, the pads are conveniently formed of a plastic material for example a high durometer polyurethene. It is to be understood however, that over wear resistant materials such as nylon could be used. A skirt 61 is conveniently provided at the outer periphery of the mounting base 10 to act primarily as a shield to inhibit entrance of large foreign objects or hands into the working parts.

From the foregoing it is though that the construction and operation of the caster apparatus will be readily understood. The rollers 51 are mounted on the caster bracket for rotation about axes extending generally radially of the swivel axis and are spaced radially outwardly of the swivel axis a distance approximating the horizontal offset of the wheel from the swivel axis and at the same side of the swivel axis as the wheel so as to aid in swivelly supporting the caster bracket on the mounting base. The pads 55a, 55b are also mounted on the caster bracket and slidably engage the trackway at the underside of the mounting base to wipe the trackway and maintain it clean for engagement by the roller 51. In addition, the pads 55 provide a swivel dampening function to inhibit free swivelling of the caster wheel when the wheels are out of engagement with the ground. The rollers 55 avoid the necessity of using expensive large diameter anti-friction bearings to swivelly support the caster and the pads 51 to keep the trackway clean for the rollers so as to avoid the necessity of providing large diameter seals between the caster bracket and mounting base.

The embodiments of the invention in which an exclusive property or privilege is claimed are defined as follows:

1. In a caster apparatus of the type including a mounting base adapted to be rigidly attached to a vehicle, caster bracket means, bracket mounting means mounting the caster bracket means on the mounting base for swivel motion relative thereto about an upright swivel axis, ground engaging wheel means, and means rotatably mounting the ground engaging wheel means on the caster bracket means for rotation about a generally horizontal wheel axis horizontally offset in one direction from said upright swivel axis, the improvement comprising: said mounting base having an annular downwardly facing trackway spaced radially outwardly from said upright swivel axis, at least one roller means mounted on said caster bracket means for rotation relative thereto about a roller axis extending radially of said swivel axis at a location above said wheel axis and in rolling engagement with said annular trackway, and at least two pad means mounted on said caster bracket means at locations to engage said annular trackway angularly adjacent relatively opposite sides of said roller means, said pad means being movable with said caster bracket means and yieldably biased upwardly into sliding engagement with said annular trackway to wipe said trackway in advance of the roller means when the caster bracket means swivels in either direction about said swivel axis and to dampen swivelling of said caster bracket means about said swivel axis.

2. In a caster apparatus according to claim 1 wherein said annular trackway and said roller means are spaced radially from the upright swivel axis a distance at least as great as the horizontal offset of said wheel axis from said caster axis.

3. In a caster apparatus according to claim 1 wherein said pad means are formed of a wear resistant non-metallic material.

4. In a caster apparatus according to claim 1 wherein said roller means includes at least two rollers mounted on said caster bracket means at locations angularly spaced substantially equal distances from a vertical extending plane through the swivel axis perpendicular to the wheel axis.

5. In a caster apparatus according to claim 4 wherein said pad means includes a pair of pads associated with each roller.

6. In a caster apparatus according to claim 1 wherein said caster bracket means includes a rigid caster bracket and a wheel support bracket pivotally mounted on the caster bracket for limited vertical swinging movement relative thereto about a horizontal axis, and yieldable means engaging said caster bracket and said wheel support bracket yieldably urging the wheel support bracket in a direction to press the wheel means downwardly relative to the caster bracket.

7. In a caster apparatus according to claim 6 including stop means on the caster bracket engageable with the wheel support bracket for limiting upward movement of the wheel support bracket.

8. In a shock absorbing type caster apparatus including a mounting base adapted to be attached to a vehicle, a caster bracket, bracket mounting means mounting the caster bracket on the mounting base for swivel motion relative thereto about an upright swivel axis, wheel support bracket means pivotally mounted on the caster bracket for limited vertical swinging movement relative thereto about a horizontal bracket axis, ground engaging wheel means mounted on the wheel support bracket for rotation about a wheel axis horizontally offset in one direction from the swivel axis, and resilient means engaging the caster bracket and the wheel support bracket yieldably biasing the latter in a direction to press the wheel means downwardly, the improvement comprising, said mounting base having an annular downwardly facing trackway spaced radially from said swivel axis, at least one roller means mounted on said caster bracket for rotation relative thereto about a roller axis extending radially of said swivel axis at a location above said wheel axis in rolling engagement with said annular trackway, and at least two pad means mounted on said caster bracket at locations to engage said annular trackway angularly adjacent relatively opposite sides of said roller means, said pad means being movable with said caster bracket and yieldably biased upwardly into sliding engagement with said annular trackway to wipe said annular trackway in advance of the roller means when the caster bracket swivels in either direction about said swivel axis and to dampen swivelling of said caster bracket about said swivel axis.

9. In a caster apparatus according to claim 8 wherein said pad means are formed of a wear resistant non-metallic material.

10. In a caster apparatus according to claim 8 wherein said horizontal bracket axis is horizontally offset from said swivel axis in a direction opposite said one direction.

* * * * *